(12) United States Patent
Moesli et al.

(10) Patent No.: US 9,340,380 B2
(45) Date of Patent: May 17, 2016

(54) METHOD AND DEVICE FOR CLOCKING IN BOOK BLOCKS

(71) Applicant: Mueller Martini Holding AG, Hergiswil (CH)

(72) Inventors: Urs Moesli, Winterthur (CH); Beat Hoerler, Baenk-Daegerlen (CH); Hanspeter Duss, Buchs (CH)

(73) Assignee: MUELLER MARTINI HOLDING AG, Hergiswil (CH)

( * ) Notice: Subject to any disclaimer, the term of this patent is extended or adjusted under 35 U.S.C. 154(b) by 0 days.

(21) Appl. No.: 14/571,780

(22) Filed: Dec. 16, 2014

(65) Prior Publication Data

US 2015/0197403 A1 Jul. 16, 2015

(30) Foreign Application Priority Data

Dec. 16, 2013 (CH) ...................................... 2082/13

(51) Int. Cl.
| | |
|---|---|
| B65G 47/31 | (2006.01) |
| B65H 5/00 | (2006.01) |
| B65H 7/00 | (2006.01) |
| B65H 31/30 | (2006.01) |

(52) U.S. Cl.
CPC ................ B65H 5/006 (2013.01); B65G 47/31 (2013.01); B65H 7/00 (2013.01); B65H 31/3054 (2013.01)

(58) Field of Classification Search
CPC ........... B65G 2220/01; B65G 2220/02; B65G 2513/104; B65G 47/31; B65G 2207/14
USPC ....................... 198/460.1, 461.1, 461.2, 461.3
See application file for complete search history.

(56) References Cited

U.S. PATENT DOCUMENTS

| | | | | |
|---|---|---|---|---|
| 4,514,963 | A | * 5/1985 | Bruno ....................... | B65B 9/06 198/460.1 |
| 5,038,915 | A | * 8/1991 | Delsanto ................. | B65B 57/16 198/419.3 |
| 5,097,939 | A | * 3/1992 | Shanklin ................ | B65G 47/31 198/419.2 |
| 5,341,915 | A | * 8/1994 | Cordia ................... | B65G 43/10 198/460.1 |

(Continued)

FOREIGN PATENT DOCUMENTS

| | | |
|---|---|---|
| DE | 2346407 A1 | 3/1974 |
| DE | 43 11 519 A1 | 10/1994 |

(Continued)

OTHER PUBLICATIONS

International Search Report of CH 20822013 Dated Mar. 12, 2014.

*Primary Examiner* — James R Bidwell
(74) *Attorney, Agent, or Firm* — FisherBroyles, LLP; Robert Kinberg

(57) ABSTRACT

An apparatus for supplying book blocks includes a feed conveyor to successively transport the book blocks with optional spacing. A buffer conveyor, arranged downstream of the feed conveyor and connected to a control unit, receives a plurality of the book blocks from the feed conveyor and transports them at a first speed, fitting against each other without a gap. A downstream clocking-in conveyor, coupled to the control unit, respectively receives a single book block from the buffer conveyor at the first speed, accelerates and transports the single book block from the first speed to a second speed. A downstream despatch conveyor includes a plurality of spaced apart pushers defining respective gaps between successive pushers. Each book is transported at the second speed toward the despatch conveyor and is inserted into one of the gaps between two successive pushers on the despatch conveyor.

12 Claims, 2 Drawing Sheets

(56) References Cited

U.S. PATENT DOCUMENTS

| | | | |
|---|---|---|---|
| 5,437,360 A | 8/1995 | Eberhard | |
| 6,629,593 B2 * | 10/2003 | Zeitler | B65G 43/08 198/460.1 |
| 7,306,087 B1 * | 12/2007 | Hamsten | B65G 47/715 198/460.1 |
| 7,938,247 B2 * | 5/2011 | Kujat | B65G 47/31 198/415 |

FOREIGN PATENT DOCUMENTS

| | | |
|---|---|---|
| DE | 29504431 U1 | 4/1996 |
| DE | 202010001437 U1 | 6/2011 |
| GB | 2 098 157 A | 11/1982 |

* cited by examiner

METHOD AND DEVICE FOR CLOCKING IN BOOK BLOCKS

CROSS REFERENCE TO RELATED APPLICATION

This application claims the priority of Swiss patent application No. 02082/13 filed on Dec. 16, 2013, the subject matter of which is incorporated herein by reference in its entirety.

BACKGROUND

1. Technical Field of the Invention

The present invention relates to an apparatus and a method for clocking in book blocks which are optionally spaced apart and supplied successively on a feed conveyor to a despatch conveyor provided with pushers at predetermined distances, wherein the apparatus is provided with a control unit that is connected to the feed conveyor and the despatch conveyor.

2. Prior Art

With book binding machines, it is standard practice to transport the products to be processed with the aid of a clocked transport system through the machine. During the transport, the products are moved past different processing stations and are processed therein. To insert the products into the clocked transport system, the products must be prepared so that they can, be inserted individually and at the correct point in time, meaning clocked, into the transport system.

An apparatus for regulating the supply of items to a packaging machine is known from German Patent Document DE 2346407, wherein this apparatus is provided successively arranged with a storage belt, a fast-moving belt for generating spacings, as well as a transport belt. This apparatus is suitable for clocking in items such as books and book blocks having different dimensions. The storage belt is provided with items fitting flush against each other, which are subsequently transferred to the faster-moving belt. The items are separated during this transfer, meaning they are pulled apart so that they are positioned at a distance to each other, wherein the spacing essentially corresponds to the spacing between the pushers on the following transport belt to which the items are finally transferred. Items having different lengths can be clocked in with the aid of this apparatus by running the storage belt at a higher or lower transport speed, depending on the length of the items. Methods of this type, however, are problematic when using book blocks composed of loose sheets and/or individual pages. If the book blocks are accelerated from the speed of the storage belt to the speed of the faster-moving belt, they can fall apart if the friction between the underside of the book block and the surface of the transport belt is higher than the friction between the sheets and/or the individual pages.

An apparatus for inserting items into a packaging machine is known from German Patent Document DE 29504431 U1. A roller carpet transports the items that are optionally spaced-apart to a buffer or accumulation belt on which the items are accumulated, such that they fit flush against each other. The items are subsequently transported further via a separating belt, while fitting flush against each other, are separated at the end of this separating belt, and are subsequently conveyed further with the aid of a clocking-in belt to a packaging machine. For the transfer from the separating belt to the clocking-in belt, the front edge of an item is detected with the aid of sensors, particularly photo-electric cells, at the discharge end of the separating belt. The belt drive is operated or stopped so that the items are conveyed into the gaps between the pushers on the feed belt. This apparatus is suitable for use with items having a high friction between the contact face and the separating belt, and which do not sustain damage during accelerations occurring during the start-stop operation of the separating belt. Book blocks which are composed of individual loose sheets and/or pages can fall apart based on this type of acceleration. Additionally, the orientation of the sheets or the individual pages within a book block can change impermissibly.

An apparatus for feeding individual sheets, stacked folded sheets, book blocks, books or similar items to a further processing machine is known from German Patent Document DE 202010001437 U1. With this apparatus, the items are successively transported onto a feed conveyor embodied as a first belt conveyor and provided at the downstream end with a blocking element for holding back the items or for releasing the items while synchronized with a receiving cycle. Arranged directly following the feed conveyor is a second belt conveyor which is operated at a higher speed than the first belt conveyor. The item in front is thus accelerated more when released by the blocking element than the following items, and the blocking element can be moved into the gap developing between the items. Furthermore arranged in the region of the feed conveyor is a pressure roller which rolls off the items and is provided with a reverse brake, wherein the pressure roller can prevent the transported items from bouncing back once they impact the blocking element. The pressure roller furthermore allows for a fast acceleration of the item positioned under the pressure roller, as soon as the item is released by the blocking element. During the transfer of the item from the first belt conveyor to the second belt conveyor, the acceleration of the item depends on the friction between the item and the second belt conveyor. If the friction is high, the item is strongly accelerated. In the case of a loose book block composed of sheets and/or individual pages, the danger thus exists that the book block can fall apart and/or the orientation of the sheets or the individual pages of the book block can change. With a low friction, on the other hand, it is not possible to reach high production speeds. Since the friction between the items and the second belt conveyor is determined by the material of the belt conveyor, the friction can only be changed through the arduous replacement of the material for the second belt conveyor. In addition, a great deal of time is needed to form the gaps between the items and for the stopping and releasing of the items by the blocking element.

With the apparatuses according to the prior art, it is therefore not possible to ensure a secure arrangement of sheets and/or the individual pages of the book block while maintaining the required orientation.

SUMMARY OF THE INVENTION

It is an object of the invention to make available a simple, cost-effective apparatus and a method which allow supplying book blocks at a high production speed to a despatch conveyor which may operate continuously or in a clocked mode. In the process, the arrangement of the book blocks should be maintained and/or the required orientation of the sheets or the individual pages in the book block should not change.

The above and other objects are achieved by the provision of an apparatus for supplying book blocks, which in one embodiment comprises: a control unit; a feed conveyor coupled to the control unit to successively transport the book blocks with optional spacing: a buffer conveyor arranged downstream of the feed conveyor and connected to the control unit to receive a plurality of the book blocks from the feed conveyor and to transport the plurality of the book blocks at a first speed while fitting against each other without a gap; a clocking-in conveyor arranged downstream of the buffer conveyor and coupled to the control unit to respectively receive a single book block from the buffer conveyor at the first speed, accelerate the single book block from the first speed to a second speed and transport the single book block at the second speed; and a despatch conveyor arranged downstream of the clocking-in conveyor and including a plurality of spaced apart pushers defining respective gaps between successive pushers, wherein each book is transported at the second speed toward the despatch conveyor and is inserted into one of the gaps between two successive pushers on the despatch conveyor.

According to one embodiment of the apparatus, a transfer conveyor that is connected to the control unit and can be driven with a variable speed is arranged downstream of the clocking-in conveyor and upstream of the despatch conveyor. In the process, at least one book block can be taken over with the speed of the clocking-in conveyor and can be transferred from the transfer conveyor to the despatch conveyor. A device for detecting the position and/or the format of the book block, in particular its dimensions in the conveying direction, is arranged in the region of the transfer conveyor, wherein a value resulting from the detection can be compared to a preset value stored in the control unit and the resulting value can then be used for varying the speed of the transfer conveyor. The resulting advantage is that by varying the speed of the transfer conveyor, book blocks can be transferred successively with even more precision into the gap between two successive pushers on the despatch conveyor.

The clocking-in conveyor can be provided with a drive, wherein at least one sensor is arranged in the region of the clocking-in conveyor for detecting the position of the book block on the clocking-in conveyor, and wherein the drive and the at least one sensor are connected to the control unit. The drive of the clocking-in conveyor can thus additionally be accelerated or delayed, corresponding to the data transmitted by the sensor to the control unit for the position of the book block on the clocking-in conveyor.

According to a different embodiment of the apparatus, the control unit may be connected to a rotation angle sensor, in particular to an incremental encoder of a drive for the despatch conveyor. The control unit can thus determine a desired position for the book block for each path section of the clocking-in conveyor and, if applicable, the transfer conveyor. A better preparation for clocking in the book blocks can furthermore be achieved in that the control unit can change the first speed of the buffer conveyor based on a deviation of the actual position of the book block, relative to its desired position.

With a different embodiment of the apparatus and given a change in the speed of the clocking-in conveyor, the control unit can determine and/or detect during the operation a maximally permissible acceleration on the basis of product information for the book blocks to be processed. For the clocking-in operation, the apparatus can thus be operated with a maximum speed which allows for safe transport of the book blocks, without displacement of the sheets and/or the individual pages in the book block.

According to yet another embodiment of the invention, the control unit is advantageously connected to a database in which additional product information is stored on the book blocks to be processed.

With another embodiment of the apparatus, a nozzle configuration, including at least one nozzle, which is directed toward the clocking-in conveyor is arranged above the clocking-in conveyor and is connected to a gas reservoir. As compared to yet another possible embodiment, provided with an upper belt for pressing the book blocks against the clocking-in conveyor or provided with pressure rollers, the book blocks can thus be processed without involved adjustment and independent of their thickness.

A read-out unit may be connected to the control unit and can furthermore be arranged in the region of the buffer conveyor, and can be used to detect identification marks on the book blocks, and to transmit the identification marks to the control unit. The buffer conveyor speed can be varied based on the detected identification marks on the book blocks, as well as based on additional data and in particular format data from a database, or based on an external memory, or from the identification marks themselves. A higher flexibility can thus be achieved for the apparatus, wherein it is possible to adapt to different features of the book block.

According to another aspect of the invention, there is provided a method for supplying book blocks, which in one embodiment comprises: a) supplying the book blocks successively and optionally spaced-apart on a feed conveyor that is coupled to a control unit; b) transferring the book blocks to a buffer conveyor arranged downstream from the feed conveyor and coupled to the control unit; c) transporting the book blocks on the buffer conveyor at a first speed to fit against each other without a gap; d) transferring a single book block at the first speed from the buffer conveyor to a clocking-in conveyor arranged downstream from the buffer conveyor and coupled to the control unit to cause the single book block to be accelerated by the clocking-in conveyor from the first speed to a second speed; e) transporting the single book block at the second speed toward a despatch conveyor having pushers arranged at a specified distance relative to each other and coupled to the control unit; and f) transferring the single book block into a gap between two successively following pushers of the despatch conveyor.

The control unit synchronizes the operation of the clocking-in conveyor with that of the despatch conveyor, such that the book blocks are transferred to the desired position between two successively following pushers on the despatch conveyor, without sustaining mechanical deformation or damage.

One modification of the method ensues if at least one book block is transferred from the clocking-in conveyor to a downstream-arranged transfer conveyor and from this conveyor to the despatch conveyor. The position and/or the format of the book block is detected in the region of the transfer conveyor, in particular the dimensions of the book block in conveying direction. A value resulting from the detection is compared to a value stored in the control unit. The result of this comparison is then used to correspondingly vary the speed of the transfer conveyor, wherein successively conveyed book blocks can be transferred with even more precision into the gap between two successively following pushers on the despatch conveyor.

In another embodiment, the transfer conveyor may supply at least one book block with the second speed to the despatch conveyor, wherein the speed of the clocking-in conveyor need not be increased to the speed of the despatch conveyor because the transfer conveyor can take over the book block at a low speed and can accelerate it to the speed of the despatch conveyor.

According to a further modification of the method, a sensor, arranged in the region of the clocking-in conveyor and connected to the control unit, determines the position of the book block respectively transported on the clocking-in conveyor, wherein the control unit compares the detected position for the book block to a desired position and, in case of a position deviation, corrects the position of the book block through correspondingly triggering an increase in the acceleration of the clocking-in conveyor, up to a maximum permissible acceleration for the book block. An even more precise positioning of the book block between the pushers on the despatch conveyor can thus be achieved.

According to a further embodiment, a read-out unit may be arranged in the region of the buffer conveyor and may be connected to the control unit for detecting identification marks on the book blocks and transmit the identification marks to the control unit. The speed of the buffer conveyor is then varied, based on the detected identification marks on the book blocks, as well as based on additional data, in particular format data from a database or an external memory, or from the identification marks themselves. A flexible adaptation of the transporting operation to the specific features of the book blocks is thus possible, in particular to the formats of the book blocks.

BRIEF DESCRIPTION OF THE FIGURES

The invention is explained in further detail in the following with the aid of Figures, which show in.

DETAILED DESCRIPTION

Figure 1:
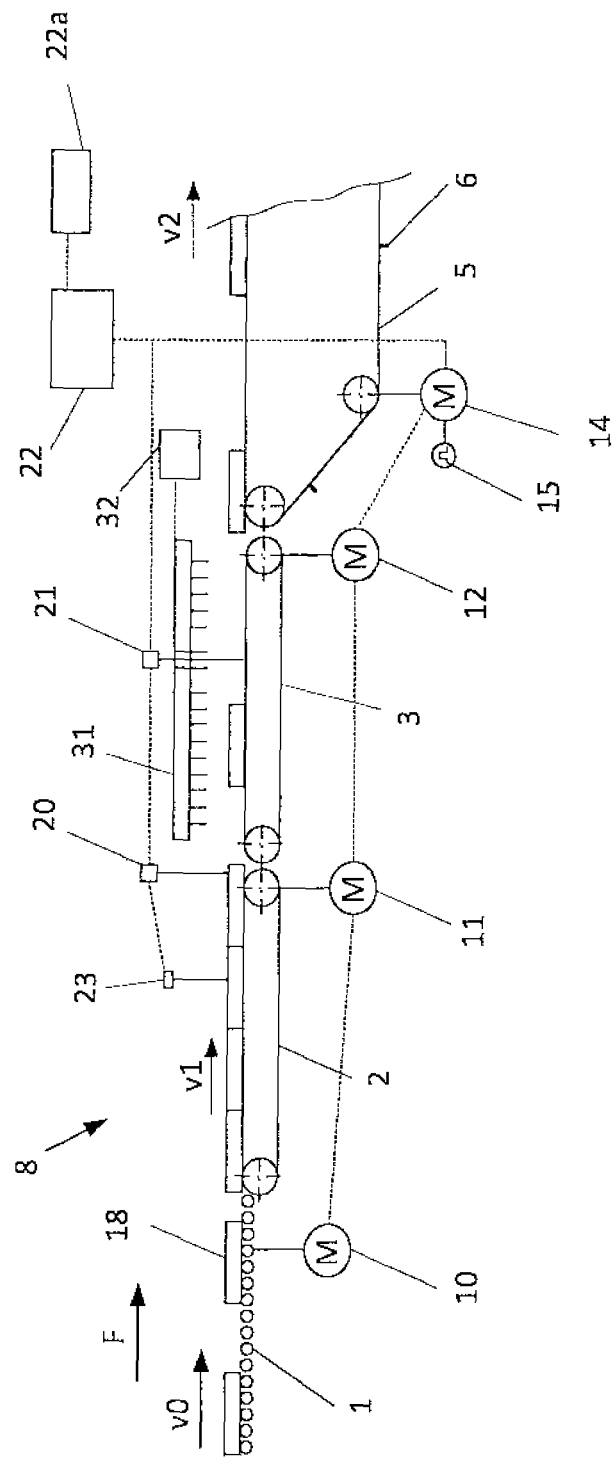
FIG. 1—A first exemplary embodiment of the apparatus according to the invention.

FIG. 1 represents a first exemplary embodiment of an apparatus 8 according to the invention, for which a feed conveyor 1, a buffer conveyor 2, and a clocking-in conveyor 3 are arranged successively in a row, in the conveying direction F and upstream of a despatch conveyor 5. The despatch conveyor 5, equipped with several uniformly spaced apart pushers 6, transports book blocks 18 to a downstream arranged further processing machine, which is not shown herein, for processing the book blocks 18. The time which passes until a following pusher occupies the position of a preceding pusher is viewed in this case as a cycle. The processing machine and/or the despatch conveyor can be operated continuously or pulsating, i.e., in a clocked operation. The pushers 6 of the despatch conveyor 5 are synchronized with the operating cycles of the further processing machine, meaning they are also clocked. A different apparatus for the clocked transport of the book blocks 18 can, of course, also be arranged downstream of the despatch conveyor 5 in place of a further processing machine.

The feed conveyor 1 is embodied, for example, as a roller conveyor and is drive-connected to a first drive 10 which is preferably embodied as frequency-controlled asynchronous motor. A slip-torque conveyor may be used for the feed conveyor 1, meaning a conveyor for which the propelling force for the book blocks 18 is lower than the frictional force between the rollers of the feed conveyor 1 and the book block 18. The buffer conveyor 2 comprises a second drive 11 which can also be embodied as frequency-controlled asynchronous motor. Arranged in the region of the buffer conveyor 2 is a read-out unit 23 for identification of marks on the book blocks 18 and a sensor 20, for example embodied as photo-electric cell, wherein the latter is preferably arranged above the downstream end of the buffer conveyor 2.

The clocking-in conveyor 3 comprises a drive 12 which is embodied as rotational-angle controlled motor. According to one preferred embodiment, a sensor 21 is arranged in the region of and possibly above the clocking-in conveyor 3, which functions to detect the position of the book blocks 18 on the clocking-in conveyor 3. According to yet another preferred embodiment, a nozzle configuration 31 is arranged above the clocking-in conveyor 3 and is connected to a gas reservoir 32. The gas reservoir 32 can furthermore have a connection, not shown herein, to the control unit 22. Of course, the clocking-in conveyor 3 can be operated with or without the sensor 21 and/or with or without the nozzle configuration 31. The despatch conveyor 5 comprises a motor functioning as a drive 14 which is provided with a rotation angle sensor 15 in the form of an incremental encoder.

All electrical devices 10, 11, 12, 14, 15, 20, 21, 23 of the apparatus 8 are connected to a joint control unit 22 to which product parameters for the book blocks 18 can be supplied via a database 22a or via manual input.

The control unit 22 obtains the information needed to determine the position of the pushers 6, relative to the actual rotational angle of the drive 14 for the despatch conveyor 5, from the rotational angle sensor 15 and from data stored in its memory. With the aid of this information, the clocking-in conveyor 3 is driven, meaning it is accelerated to the speed v2, so that the respective book block 18 is inserted in the desired position into the gap between the pushers 6 on the despatch conveyor 5. The book block 18 is finally clocked into the despatch conveyor 5 in that the pushers 6 move against the book block 18 and take over its transport on the despatch conveyor 5.

Figure 2:
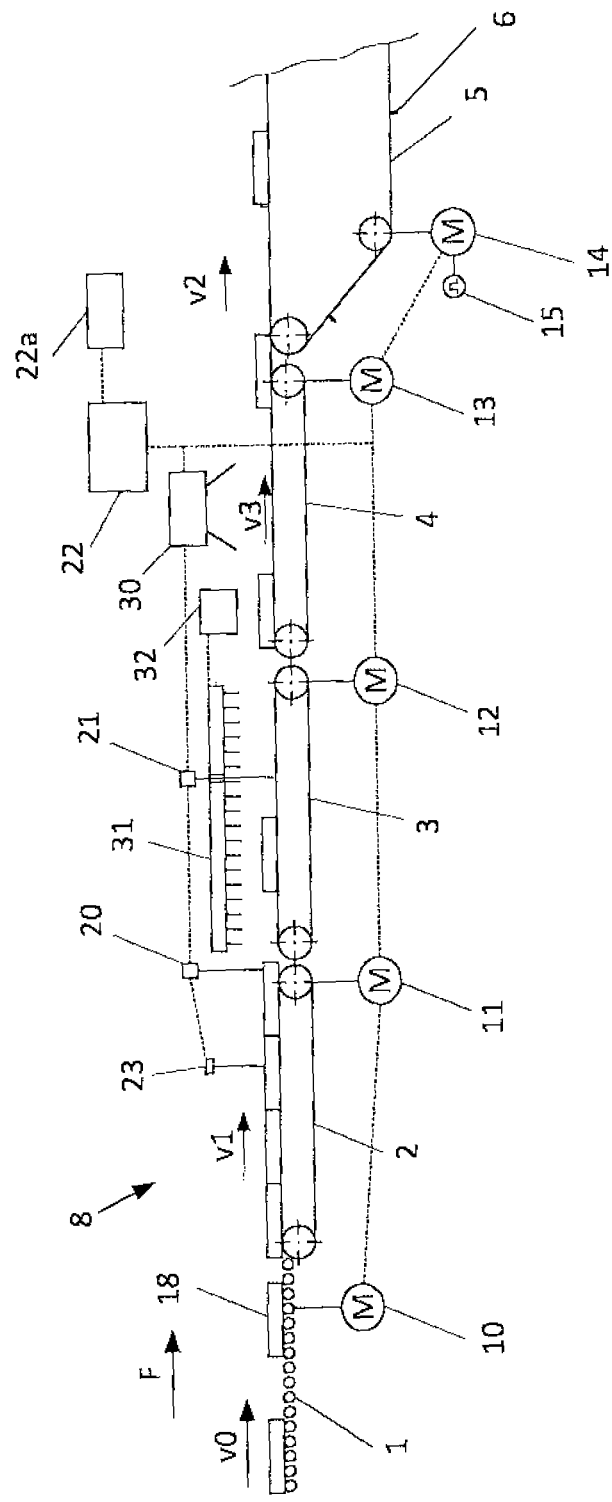
FIG. 2—A second exemplary embodiment of the apparatus according to the invention.

FIG. 2 shows a second exemplary embodiment of the apparatus 8 where a transfer conveyor 4 that is also connected to the control unit 22 is arranged downstream of the clocking-in conveyor 3 and upstream of the despatch conveyor 5. The transfer conveyor 4 comprises a drive 13 which can be embodied as a frequency-controlled asynchronous motor or as a rotational-angle controlled motor.

A device 30 that is connected to a position sensor for detecting the position and/or the format of the book block 18, in particular its dimensions in conveying direction F, can furthermore be arranged in the region of the transfer conveyor 4. The device 30, which can be embodied as a camera or a laser curtain, may be arranged above the transfer conveyor 4.

The apparatus 8 of the second embodiment also optionally comprises the nozzle configuration 31, which is connected to the gas reservoir 32.

For the operation of the apparatus 8 according to the first embodiment, several book blocks 18 are transported with the aforementioned conveying devices 1, 2, 3, 5. These book blocks 18 can respectively be composed of loose or temporarily fixated sheets and/or individual pages, books and similar print products. The book blocks 18 can be provided with identification marks, such as RFID, barcode and the like.

The irregularly spaced-apart book blocks 18 are initially transported by the feed conveyor 1 with a speed v0 in the conveying direction F to the buffer conveyor 2 and are accumulated so that they fit flush against each other, meaning the gaps between the book blocks 18 are closed. The buffer conveyor 2 is operated with a first speed v1, which is lower than the speed v0 of the feed conveyor 1.

The accumulated book blocks 18 are transported with the buffer conveyor 2 and the speed v1 in the direction of the clocking-in conveyor 3 and are transferred to this conveyor. By adapting the speed v1, the book block 18 can be transferred earlier or later, so that the transfer to the clocking-in conveyor 3 occurs at the correct point in time. However, if a book block 18 cannot be made available at the correct point in time at the transfer location between buffer conveyor 2 and clocking-in conveyor 3, the drive 11 of the buffer conveyor 2 is stopped and an empty cycle generated. The sensor 20 which is preferably arranged at the end of the buffer conveyor 2 in that case detects a front edge of a book block 18, then transmits a corresponding signal to the control unit 22 which, in turn, activates the drive 12 of the clocking-in conveyor 3, thereby ensuring that the clocking-in conveyor 3 is operated at the same or nearly the same speed as the buffer conveyor 2 during the transfer of the book block 18 from the buffer conveyor 2 to the clocking-in conveyor 3.

As soon as a book block 18 is positioned with its center of gravity in such a way on the clocking-in conveyor 3 that the book block 18 can be accelerated without slippage, the speed of the clocking-in conveyor 3 is increased up to a speed v2 which essentially corresponds to the speed of the despatch conveyor 5. As a result, the book block 18 is accelerated and separated, wherein the acceleration is selected such that a change or elimination of the orientation of the sheets and/or individual pages of the book block 18 is prevented and such that the book block 18 does not have any slippage, relative to the clocking-in conveyor 3.

The sensor 21, which is preferably arranged above the clocking-in conveyor 3, is used to detect the position of the book block 18 on the clocking-in conveyor 3. The control unit 22 then compares the actually detected position for the book block 18 to its desired position. Deviations from this position can be corrected through a corresponding triggering of the drive 12. For these corrections, the control unit 22 takes into consideration the underlying maximum permissible accelerations for the book block 18.

Reaching the second speed v2 of the clocking-in conveyor 3 is necessary so that the book block 18 can be inserted into the space between two successive pushers 6 on the following despatch conveyor 5. Once the book block 18 has reached the speed v2, the clocking-in conveyor 3 is operated with a constant speed and the book block 18 is transferred to the despatch conveyor 5. Following the takeover by the despatch conveyor 5, the respective pusher 6 is moved against the book block 18, so that the book block 18 is transported in a clocked manner by this pusher 6 to the further processing machine, which is not shown herein. The operation of clocking the book block 18, supplied on the feed conveyor 1, into the despatch conveyor 5 is thus finished.

As soon as the book block 18 is transferred to the despatch conveyor 5, the speed of the clocking-in conveyor 3 is reduced until it once more reaches the first speed v1. The clocking-in conveyor 3 is thus in a position to take over the next book block 18 from the buffer conveyor 2.

For the second exemplary embodiment, the book block 18 is moved forward and transferred to the despatch conveyor 5 by the transfer conveyor 4, which is arranged between the clocking-in conveyor 3 and the despatch conveyor 5, is operated with a variable speed v3 and is approximately synchronized with the clocking-in conveyor 3.

The transfer conveyor 4 can be used either as a simple transfer conveyor or as a correction belt. If the transfer conveyor 4 is used as a correction belt, an additional sensor, that may be embodied in detecting device 30 as previously mentioned, detects the position of the book block 18 on the transfer conveyor 4, and the control unit 22 then corrects the deviation of the actual position of the book block 18 from its desired position via the drive 13.

With the apparatus 8, a maximum possible processing speed can be computed for each book block 18 from the product parameters and the apparatus parameters. The product parameter "maximum permissible acceleration without change in the orientation of the sheets and/or the individual pages of the book block" is an important parameter. Together with the product data, this parameter can be supplied to the control unit 22 via the database 22a or can be entered manually into the control unit 22.

One method for determining these product parameters can be realized as follows: The control unit 22 starts up the apparatus 8 with a low acceleration value. During the course of the production, the control unit 22 automatically increases the acceleration value and the device 30, which is may be arranged above the transfer conveyor 4, monitors the orientation of the sheets and/or the individual pages of the book block 18. If a change is detected in the orientation of the sheets and/or the individual pages of the book block 18, this information is used to define the maximum permissible acceleration value for the order involving the corresponding book blocks 18.

According to a different variant of the first as well as the second exemplary embodiment, air or a different gas, supplied by the gas reservoir 32, can be blown with the additional nozzle configuration 31 onto the book block 18 that is transported on the clocking-in conveyor 3. The gas reservoir 32 can be connected to the control unit 22. In case of production interruptions, the supply of gas can thus be stopped by the control unit 22. In addition, the control unit 22 makes possible a precise metering of the amount of gas streaming out. As a result of the gas streaming out of several nozzle holes of the nozzle configuration 31, the sheets and/or the individual pages of the book block 18 are admitted with an additional force that acts like a weight force. This additional weight force increases the force required to displace, relative to each other, the sheets and/or the individual pages of the book block 18. The clocking-in conveyor 3 can consequently be subjected to higher accelerations, without causing a change in the orientation of the sheets and/or the individual pages of the book block 18, transported thereon.

The apparatus 8 as described in the above can also be used for orders where the format of the book block 18 changes from book to book. For this, the read-out unit 23 detects the identification marks on each book block 18. The format of the book block 18 in conveying direction F, which is required for the following activation of the apparatus 8, is then read out of the identification mark (RFID, bar code, and the like), or is read out of a database and is used to determine the adjustment variables for the apparatus 8. The device 30 can also be used for this, wherein this device can detect the position and/or the format of the book block 18, in particular its dimensions in conveying direction F, and can transmit these values to the control unit 22. By correspondingly changing the speed v1 of the buffer conveyor 2, the feeding of the book blocks 18 to a clocked despatch conveyor 5 can thus be realized without having to generate empty cycles.

It will be understood that the above description of the present invention is susceptible to various modifications, changes and adaptations, and the same are intended to be comprehended within the meaning and range of equivalents of the appended claims.

What is claimed is:

1. An apparatus for supplying book blocks, comprising:
   a control unit;
   a feed conveyor coupled to the control unit to successively transport the book blocks with optional spacing:
   a buffer conveyor arranged downstream of the feed conveyor and connected to the control unit to receive a plurality of the book blocks from the feed conveyor and to transport the plurality of the book blocks at a first speed while fitting against each other without a gap;
   a clocking-in conveyor arranged downstream of the buffer conveyor and coupled to the control unit to respectively receive a single book block from the buffer conveyor at the first speed, accelerate the single book block from the first speed to a second speed and transport the single book block at the second speed;

a path conveyor arranged downstream of the clocking-in conveyor and including a plurality of spaced apart pushers defining respective gaps between successive pushers, wherein each book is transported at the second speed toward the path conveyor and is inserted into one of the gaps between two successive pushers on the path conveyor; and a read-out unit arranged in a region of the buffer conveyor and couple to the control unit to detect and to transmit identification marks of the book blocks to the control unit, wherein the control unit adjusts the first speed of the buffer conveyor based on at least one of the detected identification marks of the book blocks and additional data from a database, an external memory, or the identification marks themselves.

2. The apparatus according to claim 1, further comprising:
a transfer conveyor coupled to the control unit and arranged between the clocking-in conveyor and the path conveyor to be driven with a variable speed so that the single book block is taken over with the speed of the clocking-in conveyor and transferred to the path conveyor; and a device to detect at least one of a position and a dimension in a conveying direction of the single book block, arranged in a region of the transfer conveyor and producing a corresponding detection value;

wherein the control unit forms a comparison representing a difference between the detection value and a value specified in the control unit and adjusts the variable speed of the transfer conveyor as a function of the comparison.

3. The apparatus according to claim 1, further comprising a sensor arranged in a region of the clocking-in conveyor to detect a position of the single book block and a drive coupled to the clocking-in conveyor, wherein the drive and the sensor are connected to the control unit to control acceleration of the clocking-in conveyor to the second speed.

4. The apparatus according to claim 1, further comprising a drive arranged to drive the clocking-in conveyor and coupled to the control unit, and a rotational angle sensor coupled to the control unit and arranged to detect a rotational angle of the drive, wherein the drive controls acceleration of the clocking-in conveyor as a function of the rotational angle of the drive.

5. The apparatus according to claim 3, wherein the control unit adjusts the first speed of the buffer conveyor as a function of a deviation of one of the book blocks from a desired position.

6. The apparatus according to claim 1, wherein the clocking-in conveyor has a maximum permissible speed for a given book block that is determinable by the control unit from at least one of product information of the book block stored in the control unit and ascertained during operation.

7. The apparatus according to claim 6, further comprising a database connected to the control unit, wherein further product information for the book blocks to be processed is stored in the database.

8. An apparatus for supplying book blocks, comprising:
a control unit;
a feed conveyor coupled to the control unit to successively transport the book blocks with optional spacing:
a buffer conveyor arranged downstream of the feed conveyor and connected to the control unit to receive a plurality of the book blocks from the feed conveyor and to transport the plurality of the book blocks at a first speed while fitting against each other without a gap;

a clocking-in conveyor arranged downstream of the buffer conveyor and coupled to the control unit to respectively receive a single book block from the buffer conveyor and couple to first speed, accelerate the single book block from the first speed to a second speed and transport the single book block at the second speed;

a path conveyor arranged downstream of the clocking-in conveyor and including a plurality of spaced apart pushers defining respective gaps between successive pushers, wherein each book is transported at the second speed toward the path conveyor and is inserted into one of the gaps between two successive pushers on the path conveyor; and at least one nozzle adapted to be connected to a gas reservoir, and arranged above and focused onto the clocking-in conveyor.

9. A method for supplying book blocks, comprising:
a) supplying the book blocks successively and optionally spaced-apart on a feed conveyor that is coupled to a control unit;
b) transferring the book blocks to a buffer conveyor arranged downstream from the feed conveyor and coupled to the control unit;
c) transporting the book blocks on the buffer conveyor at a first speed to fit against each other without a gap;
d) transferring a single book block at the first speed from the buffer conveyor to a clocking-in conveyor arranged downstream from the buffer conveyor and coupled to the control unit to cause the single book block to be accelerated by the clocking-in conveyor from the first speed to a second speed;
e) transporting the single book block at the second speed toward a path conveyor having pushers arranged at a specified distance relative to each other and coupled to the control unit; and
f) transferring the single book block into a gap between two successively following pushers of the path conveyor;
g) detecting with a read-out unit, arranged in a region of the buffer conveyor and connected to the control unit, identification marks on the book block;
h) transmitting the identification marks to the control unit; and
i) varying the speed of the buffer conveyor based on at least one of the detected identification marks of the book block and additional data from a database, and external memory, or the identification marks themselves.

10. The method according to claim 9, wherein the e) transporting step includes:
transferring at least one book block from the clocking-in conveyor to a transfer conveyor arranged between the clocking-in conveyor and the path conveyor, and coupled to the control unit; and
transferring the at least one book block from the transfer conveyor to the path conveyor;
the method further comprising:
detecting in a region of the transfer conveyor at least one of a position and a dimension of the book block in a conveying direction;
comparing a value resulting from detecting step to a value specified in the control unit; and
varying the speed of the transfer conveyor as a function of a comparison value resulting from the comparing step.

11. The method according to claim 10, wherein transferring the at least one book block from the transfer conveyor to the path conveyor includes transporting the at least one book block by the transfer conveyor at the second speed to the path conveyor.

12. The method according to claim 9, further comprising:
- detecting with a sensor, arranged in a region of the clocking-in conveyor and connected to the control unit, the position of the single book block that is respectively transported on the clocking-in conveyor;
- comparing with the control unit an actual position of the single book block to a desired position; and
- correcting the position of the book block by activating the clocking-in conveyor up to a maximum permissible acceleration for the book block in the event of a position deviation from the desired position.

* * * * *